April 17, 1962     R. D. BORGERSEN ETAL     3,029,631
APPARATUS FOR MEASURING HARDNESS Filed Aug. 26, 1959     2 Sheets-Sheet 2

INVENTORS
ROLAND D. BORGERSEN
ROY H. BORGERSEN &
BY     WILLIAM L. JOBE

ATTORNEY 3,029,631
APPARATUS FOR MEASURING HARDNESS
Roland D. Borgersen, Wynnewood, Roy H. Borgersen, Bryn Mawr, and William L. Jobe, Plymouth Meeting, Pa., assignors to King Tester Corp., Philadelphia, Pa., a corporation of Pennsylvania
Filed Aug. 26, 1959, Ser. No. 836,219
5 Claims. (Cl. 73—81)

This invention relates to improvements in apparatus for measuring the hardness of the interior surface of a cylinder or the like. The invention is more particularly concerned with apparatus for making accurate hardness tests on the interior surfaces of cylinders, pipes, bored holes, and the like, and to the making of such hardness tests expeditiously.

Heretofore, the making of Brinell hardness tests in inaccessible places, such as the interior surface of a cylinder, has been difficult because of the small size of the openings and because conventional testing and measuring devices were not adapted to be inserted into the interior of such openings. Although devices adapted for insertion into such openings have heretofore been proposed, such devices have proved somewhat less than satisfactory in that they were expensive, complicated pieces of machinery which were difficult to maintain and to keep in adjustment to give accurate measurements.

It is an object of this invention to provide apparatus for measuring the hardness of interior surfaces of a cylinder or the like, and to provide such apparatus which overcome the foregoing problems and disadvantages.

It is another object of this invention to provide a hardness tester which may be operated to make Brinell tests within bores and cavities which heretofore have been inaccessible.

It is another object of this invention to provide a hardness tester which gives a permanent record of the hardness test.

It is another object of this invention to provide a hardness tester which is adjustable for testing various sizes of cylinders or the like.

It is another object of this invention to provide a hardness tester which is portable.

It is another object of this invention to provide a hardness tester which is adapted to be used to test the hardness of the interior surfaces of cylinders or the like of various thicknesses.

Other objects and advantages of this invention, including its simplicity and economy, as well as the ease with which it may be adapted to existing equipment, will further become apparent hereinafter and in the drawings, in which:

FIG. 3 is a view in section taken as indicated by the lines and arrows III—III which appear in FIG. 1;

FIG. 4 is a view in section taken as indicated by the lines and arrows IV—IV which appear in FIG. 1; and FIG. 5 is a view in section taken as indicated by the lines and arrows V—V which appear in FIG. 1.

Figure 1:
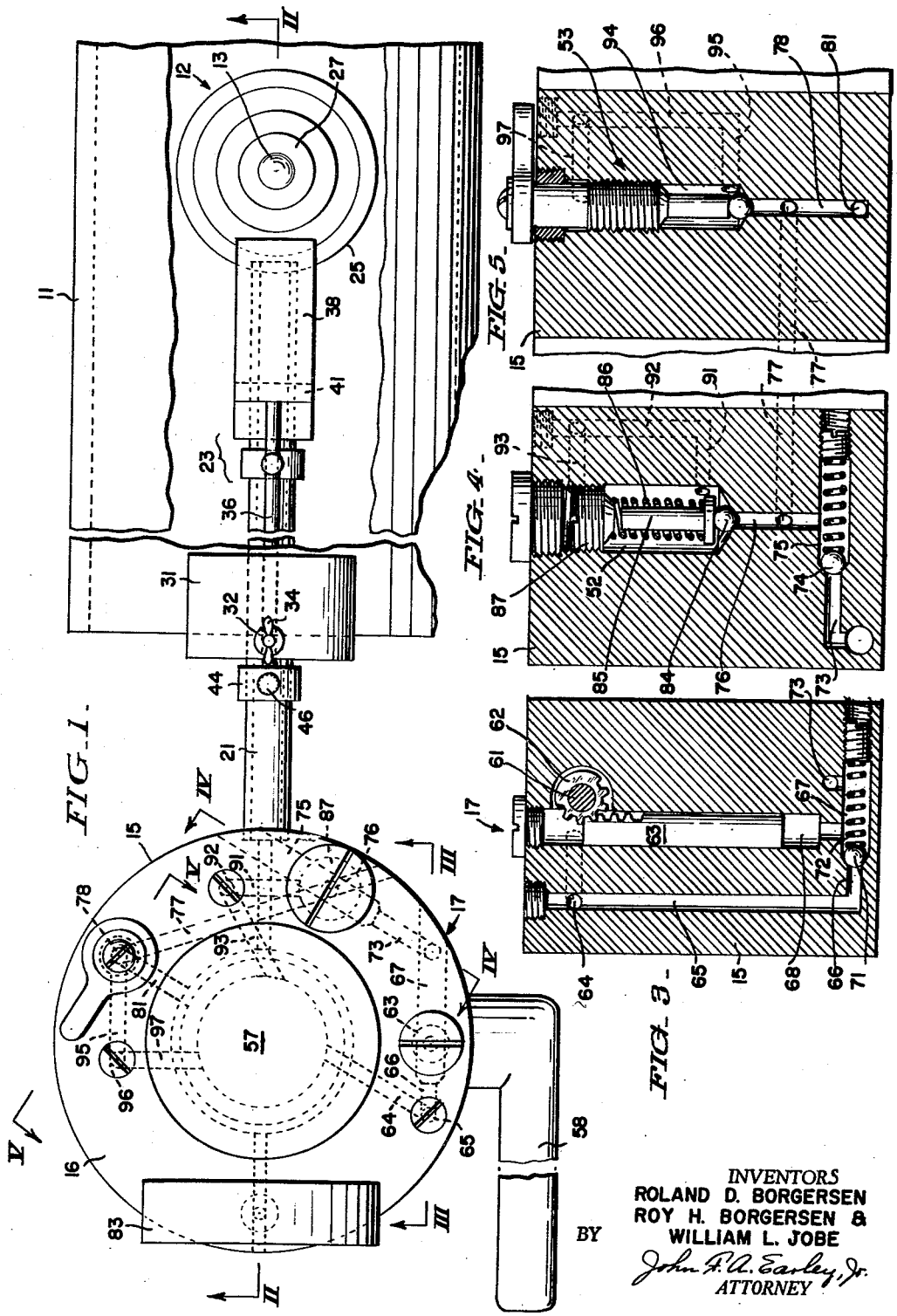
FIG. 1 is a view in top plan of a hardness tester constructed in accordance with this invention.
Figure 2:
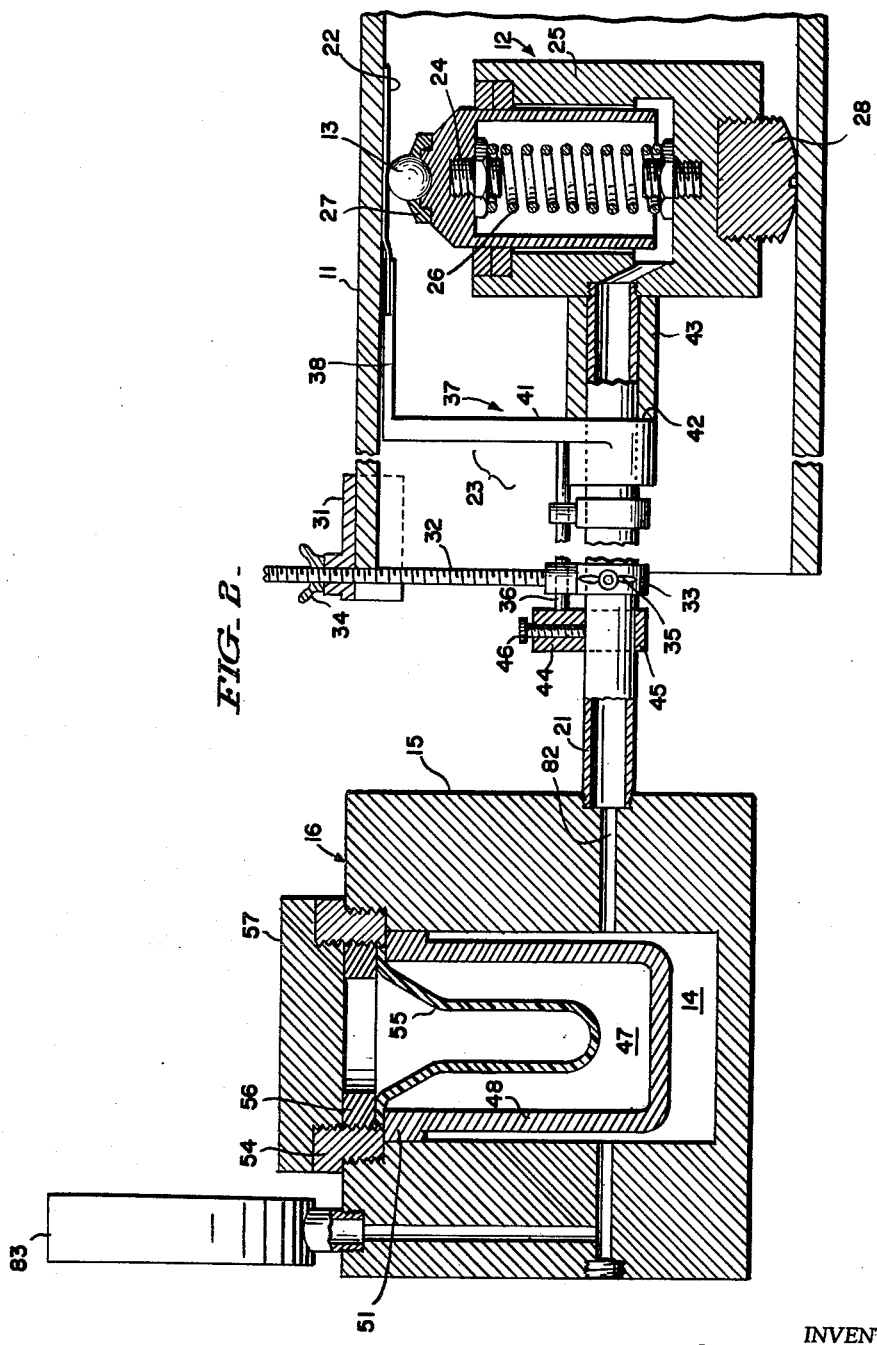
FIG. 2 is a view in side elevation and partly in section, taken as indicated by the lines and arrows II—II which appear in FIG. 1.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a hardness tester for measuring the interior surface of a cylinder 11 or the like, which hardness tester includes an auxiliary pressure chamber 12 having an indenting ball 13 reciprocably mounted therein for indenting the interior surface of cylinder 11 to make an impression thereon. Also provided is a main pressure chamber 14 which is formed within a housing 15 of a test head 16 (which is a hydraulic pressure unit). A pump 17 is provided for generating pressure in a liquid (which may be oil) contained within pressure chamber 14. Connecting test head 16 and its pressure chamber 14 with auxiliary pressure chamber 12 is an extension arm 21.

An impression plate 22, which is preferably made of aluminum foil, is mounted on positioning mechanism 23. Mechanism 23 is mounted on extension arm 21 and adapted to be moved along the extension arm to position the impression plate 22 between the impression made in the interior surface of cylinder 11 and the indenting ball 13, thereby to transfer the outline of the impression to impression plate 22.

Auxiliary pressure chamber 12 has seated therein a hydraulic ram 24 which is connected to a housing 25 by a spring 26. A ball holder 27 affixes the indenting ball 13 to the head of the ram 24, and an adjustable screw 28 is mounted in housing 25 and is facing away from indenting ball 13. Adjustable screw 28 forms an adjustable reaction means which bears against the opposite wall of cylinder 11 from that which is contacted by indenting ball 13. Ball 13 makes the Brinell impression in the interior surface of cylinder 11 as ram 24 is forced out from housing 25 by hydraulic pressure.

Positioning mechanism 23 includes a bracket 31 which is adjustably positioned on a stud 32 to contact the exterior surface of cylinder 11. Stud 32 abuts against the open end of cylinder 11 and is supported in a collar 33 which is adjustably positioned along extension arm 21. Wing nuts 34 and 35 are provided for locking bracket 31 and collar 33 in place.

Slidably mounted within collar 33 is a foil-holder rod 36 which is terminated at one end by the impression plate holder 37 which is slidable on extension arm 21 and which is provided with fingers 38 for holding impression plate 22. Forward surface 41 of impression plate holder 37 abuts against a shoulder 42 of an enlarged portion 43 of extension arm 21. Shoulder 42 acts as a stop mechanism for limiting the movement of rod 36 in the direction of auxiliary chamber 12 so as to position impression plate 22 to register with ball 13 to transfer the outline of the impression to the impression plate. Bracket 31 and stud 32 serve to hold extension arm 21 in the same fixed position during the transfer of the impression to impression plate 22, as during the making of the impression on the interior surface of cylinder 11.

The other end of rod 36 is provided with a clamp 44 which includes a slidable collar 45 and a set screw 46.

Test head 16 includes an oil sump or a reservoir 47 which is formed by a cup-like element 48 having a flange 51. Besides pump 17, there are provided a pressure relief valve 52, and a pressure release valve 53.

The upper end of cup-like element 48 is press fitted into the bore of housing 15, thus providing an oil-tight separation between pressure chamber 14 and oil sump 47. The upper end of the bore of housing 15 is threaded to receive a nut 54 which bears against the upper surface of flange 51 to lock cup-like element 48 in place.

A flexible, fluid-proof sac 55 is positioned in oil sump 47 and is held in place by a threaded washer 56 which engages the thread on the inner wall of the retaining nut 54. Elastic sac 55 prevents oil from escaping from sump 47 and expands and contracts under varying oil conditions within sump 47. A cap 57 is provided which is threaded into retaining unit 54.

Pump 17 is provided with a pump handle 58 which is attached to a shaft 61 to which a segmental gear 62 is keyed. Gear 62 actuates pump plunger 63.

When pump plunger 63 is raised, oil is sent from sump 47 through a horizontal duct 64. This oil passes downwardly through vertical duct 65 and horizontal duct 66 through ball valve chamber 67 into the pump cylinder 68.

Then as plunger 63 is caused to move downwardly, the oil trapped within pump cylinder 68 is forced into ball valve chamber 67. Since ball 71 is seated because of the pressure of spring 72 and the oil pressure from pump cylinder 68, the oil is forced through a duct 73 to pass ball 74 into valve chamber 75.

Oil that has reached valve chamber 75 cannot reverse its flow because of the action of ball 74, and as a result of continued pumping, the oil continues to flow and flows from valve chamber 75 through the vertical duct 76, horizontal duct 77, vertical duct 78, and horizontal duct 81 which empties into pressure chamber 14. As more oil is forced into pressure chamber 14, the pressure is gradually built up therein and transferred through a horizontal duct 82 and extension arm 21 to auxiliary pressure chamber 12 to move hydraulic ram 24.

Also connected to pressure chamber 14 is a pressure gage 83. Built into this series of high pressure ducts within housing 15 are pressure relief valve 52 and pressure release valve 53.

Pressure relief valve 52 is preset to open at a given oil pressure and is preferably a spring-controlled ball valve in which a ball 84 is normally seated at the upper end of duct 76 through the action of a spring-actuated plunger 85. The tension of spring 86 may be adjusted by adjusting a nut 87 which is threaded into a bore above the spring 86. When oil pressure is too high, the ball 84 is forced away from its seat and the oil in high pressure duct 76 flows through a relief valve chamber to empty back into sump 47 by passing through the ducts 81—93.

Pressure release valve 53 is manually operated to allow the oil in high pressure duct 78 to flow through valve chamber 84 and ducts 95—97 to empty back into the sump 47.

In operation, auxiliary pressure chamber 12 is inserted into the interior of cylinder 11. Then chamber 12 is fixed in position by bringing stud 32 into contact with the end of cylinder 11 and by bringing bracket 31 into contact with the exterior surface of the cylinder. Then the stud and bracket are clamped into position. Pump handle 58 is operated to build up the pressure of the oil within pressure chamber 14 and oil pressure is transferred to auxiliary pressure chamber 12 to force hydraulic ram 24 outwardly so that indenting ball 13 makes an impression on the interior surface of the cylinder 11.

Having made the impression, the detenting ball 13 is withdrawn from the impression by operating the release valve 53 to lower the hydraulic pressure.

Impression plate 22 is moved into position between indenting ball 13 and the impression. This is accomplished by moving rod 36 along extension arm 21 until the forward surface 41 of impression plate holder 37 abuts the shoulder 42 of enlarged portion 43 of extension arm 21. Rod 36 is clamped in position by turning down on set screw 46. Then the outline of the impression is transferred to impression plate 22 by moving indenting ball 13 back into the impression with plate 22 positioned therebetween. This is accomplished by pumping up the pressure of the oil and transferring it to auxiliary pressure chamber 12 to force hydraulic ram 24 outwardly.

The hydraulic pressure is released and the indenting ball 13 withdrawn. Impression plate 22 is withdrawn from within cylinder 11 and has impressed thereon the exact outline of the impression. After the impression is secured on the impression plate 22, and the outline of the impression thereon is measured in the conventional way by means of a Brinell microscope, the impression plate 22 may be retained as a permanent record of the exact diameter of the impression.

In practice, the effective size of the auxiliary pressure chamber 12 may be adjusted by means of adjustable screw 28 so that tests may readily be made in pipes or cylinders or the like, having an inside diameter in the range between two inches and seven inches. Tests may be made at any reasonable depth away from the open end of the pipe. A 10 mm. Brinell ball or a 5 mm. carbide ball may be used. The applied load may be varied from between 125 kg. through 1000 kg. and this variation in load provides for obtaining the optimum size of indentation from metals of various hardness, and also serves to prevent any distortion of tough specimens which have thin walls. The total weight of the hardness tester constructed in accordance with this invention is less than 15 pounds so that it is easily portable.

It is to be understood that the form of the invention herewith shown and described is to be taken as a prepared embodiment. Various changes may be made in the shape, size and arrangement of parts. For example, equivalent elements may be substituted for those illustrated and described herein, parts may be reversed, and certain features of the invention may be utilized independently of the use of other features, or without departing from the spirit or scope of the invention as defined in the subjoined claims.

The claimed invention:

1. A hardness tester for measuring the hardness of the interior surface of a cylinder or the like, comprising auxiliary pressure chamber means having a reciprocably mounted indenting ball for indenting interior surfaces to make an impression therein, reaction means extending in the direction away from said ball for contacting the interior surface of the cylinder, main pressure chamber means containing a liquid, an extension arm connecting the two pressure chambers and providing a passage therebetween for said liquid, pump means connected to the liquid for generating pressure therein to move said indenting ball outwardly to indent the interior surface of said cylinder and make an impression therein, means for retracting said indenting ball from said impression, an impression plate for receiving the outline of said impression, and positioning means mounted on said extension arm for positioning said impression plate between said impression and said indenting ball, said pump means being adapted to move said ball into contact with said impression plate to transfer the outline of said impression to said plate.

2. The hardness tester defined in claim 1, wherein said reaction means is provided with means for adjusting the position of said reaction means along the line of ball travel to accommodate cylinders of various bore size.

3. A hardness tester for measuring the hardness of the interior surface of a cylinder or the like, comprising auxiliary pressure chamber means having a reciprocably mounted indenting ball for indenting interior surfaces to make an impression therein, main pressure chamber means containing a liquid and having a pump for generating pressure in the liquid, an extension arm connecting the two pressure chambers and providing a passage therebetween for said liquid, an impression plate for receiving the outline of said impression, and positioning means mounted on said extension arm for positioning said impression plate between said impression and said indenting ball to transfer the outline of said impression to said plate, said positioning means including a bracket which is slidably mounted on said extension arm and adjustably positioned thereon and adapted to abut against an open end of said cylinder, a foil-holder rod slidably mounted in said bracket, supporting means mounted on the end of said rod away from said main pressure chamber for supporting said impression plate, clamping means mounted on said rod for fixing said rod in position relative to said extension arm, and stop means mounted on said extension arm for limiting the movement of said rod in the direction of said ball so as to position said impression plate to register with said ball, whereby said bracket holds said extension arm in the same fixed position during the transfer of said impression to the impression plate as during the making of the impression on said interior surface.

4. A hardness tester for measuring the hardness of the interior surface of a cylinder or the like, comprising a housing having a seat formed therein, a ram slidably mounted in said seat and forming an auxiliary pressure chamber with said housing, an indenting ball mounted in the end of the ram, reaction means extending in the direction away from said ball for contacting the interior surface of said cylinder, an extension arm connected at one end to said auxiliary pressure chamber, a liquid contained within said pressure chamber and extension arm, pump means connected to the other end of said extension arm for building up pressure in said liquid to move said ram and cause said ball to indent said interior surface to make an impression thereon, an impression plate for receiving the outline of said impression, and means for positioning said impression plate between said impression and said indenting ball and for withdrawing said plate from said position, whereby the outline of said impression is formed in said plate.

5. The hardness tester defined in claim 4, wherein said impression plate is a sheet of aluminum foil.

References Cited in the file of this patent

UNITED STATES PATENTS

| | | |
|---|---|---|
| 1,354,218 | Schneider | Sept. 28, 1920 |
| 2,029,066 | Geppert | Jan. 28, 1936 |
| 2,835,127 | Scott | May 20, 1958 |
| 2,839,917 | Webster | June 24, 1958 |
| 2,956,432 | Henrikson | Oct. 18, 1960 |